US011520612B2

(12) United States Patent
Veale et al.

(10) Patent No.: US 11,520,612 B2
(45) Date of Patent: Dec. 6, 2022

(54) VIRTUAL MACHINE MIGRATION DETECTION BY A HOSTED OPERATING SYSTEM

(71) Applicant: International Business Machines Corporation, Armonk, NY (US)

(72) Inventors: Brian Frank Veale, Cedar Park, TX (US); Juan M. Casas, Jr., Round Rock, TX (US); Caleb Russell Olson, Austin, TX (US); Amanda Liem, Travis, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 477 days.

(21) Appl. No.: 16/682,877

(22) Filed: Nov. 13, 2019

(65) Prior Publication Data

US 2021/0141654 A1    May 13, 2021

(51) Int. Cl.
*G06F 9/455* (2018.01)
*G06F 9/445* (2018.01)

(52) U.S. Cl.
CPC ...... *G06F 9/45545* (2013.01); *G06F 9/44505* (2013.01); *G06F 9/45558* (2013.01);
(Continued)

(58) Field of Classification Search
CPC ............. G06F 9/45545; G06F 9/45505; G06F 9/45558; G06F 2009/4557; G06F 2009/45595; G06Q 30/04
See application file for complete search history.

(56) References Cited

U.S. PATENT DOCUMENTS 8,239,863 B2 * 8/2012 Bhat ..................... G06F 11/203
  718/1
8,875,129 B2   10/2014 Wagner et al.
(Continued)

FOREIGN PATENT DOCUMENTS

CN    103812823 A    5/2014
CN    107291527 A    10/2017
(Continued)

OTHER PUBLICATIONS

S. Ghorbani, C. Schlesinger, M. Monaco, E. Keller, M. Caesar, J. Rexford, and D. Walker, "Transparent, live migration of a software-defined network," SOCC '14, (New York, NY, USA), pp. 3:1-3:14, ACM (Year: 2014).*
(Continued)

*Primary Examiner* — Jacob D Dascomb
(74) *Attorney, Agent, or Firm* — Garg Law Firm, PLLC; Rakesh Garg; Nathan Rau

(57) ABSTRACT

In an embodiment, a guest operating system (OS) running on a virtual machine (VM) detects a VM migration, where the embodiment comprises storing, by the guest OS, a VM identifier (VMID) provided by the VM and a first host identifier (HID) provided by a host computer system in a computer memory. The embodiment also comprises determining, by the guest OS, that the VM performs migrations that are transparent to the guest OS. The embodiment further comprises detecting, by the guest OS, that the VM has been migrated based on a comparison of the first HID to a second HID provided to the guest OS in response to an HID request from the guest OS.

20 Claims, 4 Drawing Sheets

(52) U.S. Cl.
CPC ........... *G06F 2009/4557* (2013.01); *G06F 2009/45595* (2013.01)

(56) References Cited

U.S. PATENT DOCUMENTS

| | | | |
|---|---|---|---|
| 8,959,173 B1* | 2/2015 | Robidoux | G06F 3/0619 |
| | | | 709/215 |
| 9,032,160 B1* | 5/2015 | Natanzon | G06F 11/1471 |
| | | | 711/135 |
| 9,104,460 B2 | 8/2015 | Jansen | |
| 9,436,751 B1 | 9/2016 | Serebrin | |
| 9,672,057 B2 | 6/2017 | Tsirkin | |
| 9,729,660 B2 | 8/2017 | Venkatesan et al. | |
| 9,792,150 B1 | 10/2017 | Rangari et al. | |
| 10,102,018 B2 | 10/2018 | Morgan | |
| 10,333,827 B2 | 6/2019 | Xu et al. | |
| 10,375,169 B1 | 8/2019 | Diallo et al. | |
| 2010/0205252 A1 | 8/2010 | Dorai et al. | |
| 2017/0017512 A1 | 1/2017 | Csatari et al. | |
| 2018/0139272 A1 | 5/2018 | Puri et al. | |
| 2018/0241838 A1 | 8/2018 | Druzhinin et al. | |
| 2018/0329646 A1 | 11/2018 | Dai et al. | |
| 2019/0065228 A1 | 2/2019 | Tsirkin et al. | |
| 2019/0068724 A1 | 2/2019 | Tsirkin et al. | |
| 2019/0163521 A1 | 5/2019 | Lee et al. | |
| 2019/0286469 A1 | 9/2019 | Lakshmikantha et al. | |

FOREIGN PATENT DOCUMENTS

| | | |
|---|---|---|
| CN | 108351802 A | 7/2018 |
| CN | 109710386 A | 5/2019 |
| WO | 2011057874 A2 | 5/2011 |
| WO | 2016041521 A1 | 3/2016 |

OTHER PUBLICATIONS

Nelson et al., Fast Transparent Migration for Virtual Machines, ATEC'05 ACM USENIX Annual Technical Conference on, pp. 391-394, Apr. 10-15, 2005.

Lu et al.; HSG-LM: Hybrid-Copy Speculative Guest OS Live Migration Without Hypervisor, SYSTOR'13 6th ACM International Symposium on, pp. 1-11, Jun. 30-Jul. 2, 2013.

Jo et al., A Machine Learning Approach to Live Migration Modeling, SoCC'17 ACM International Symposium on Cloud Computing, pp. 351-364, Sep. 24-17, 2017.

Raghunath et al., Virtual Machine Migration Triggering Using Application Workload Prediction, Procedia Computer Science, vol. 54, pp. 167-176, Aug. 21-23, 2015.

List of all IBM related dockets, Appendix P, 2019.

International Searching Authority, PCT/IB2020/060564, dated Feb. 23, 2021.

International Searching Authority, PCT/IB2020/060565, dated Feb. 23, 2021.

* cited by examiner

VIRTUAL MACHINE MIGRATION DETECTION BY A HOSTED OPERATING SYSTEM

TECHNICAL FIELD

The present invention relates generally to a method, system, and computer program product for virtual machine migration. More particularly, the present invention relates to a method, system, and computer program product for virtual machine migration detection by a hosted operating system.

BACKGROUND

A virtual machine (VM) is a software-defined computer and guest OS running on a host system that operates its own host OS. Generally, a VM provides a software execution environment and may have a virtual processor, virtual system memory, virtual storage, and various virtual devices. VMs represent a form of system virtualization implemented through some managing functionality, typically hypervisor technology. Hypervisors, also called virtual machine managers (VMMs), use a thin layer of code in software or firmware to achieve fine-grained, dynamic resource sharing. Because hypervisors provide the greatest level of flexibility in how virtual resources are defined and managed, they are generally the primary technology for system virtualization.

VMs may be migrated between a source host computing platform ("the source host") and a target host computing platform ("the target host") connected over a network, which may be a local area network or a wide area network that may include the Internet. Migration permits a clean separation between hardware and software, thereby improving facilities fault management, load balancing, and low-level system maintenance. Live migration permits an administrator to move a running VM between different physical machines without disconnecting a running client or application program.

SUMMARY

The illustrative embodiments provide for detecting a VM migration by a guest operating system (OS) running on the VM. An embodiment includes storing, by the guest OS, a VM identifier (VMID) provided by the VM and a first host identifier (HID) provided by a host computer system in a computer memory. The embodiment also comprises determining, by the guest OS, that the VM performs migrations that are transparent to the guest OS. The embodiment further comprises detecting, by the guest OS, that the VM has been migrated based on a comparison of the first HID to a second HID provided to the guest OS in response to an HID request from the guest OS.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
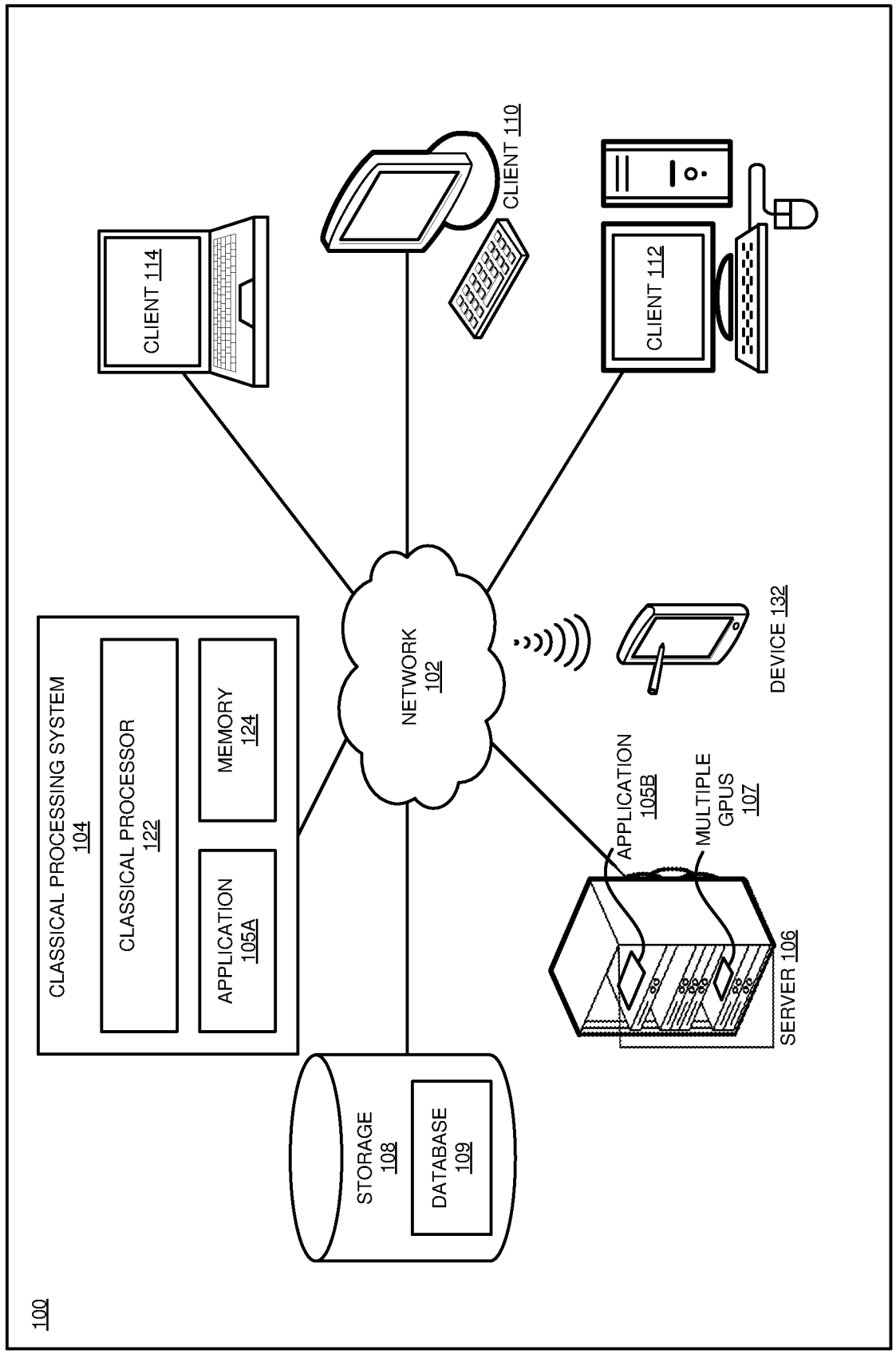
FIG. 1 depicts a block diagram of a network of data processing systems in which illustrative embodiments may be implemented.

Live migration is a technology that facilitates moving an entire running VM from one physical machine to another. Live VM migration at the level of an entire VM means that active memory and execution state are transferred from the source to the destination. As a result, live VM migration allows the VM to move to another physical machine without disruption to the workload inside of the VM. Live migration of VMs and the standby mode of physical servers are automatically orchestrated by an algorithm engine.

The support and framework needed for live VM migration can be broken into multiple models based on a range of awareness that the VM provides to the guest OS whenever a VM migration is occurring or has occurred. These models are cooperative, notification-only, and transparent. In the cooperative model, the VM provides the guest OS with notifications about VM migration activities and confirms that the guest OS received the notifications. In the notification-only model, the VM only provides the guest OS with notifications about VM migration activities prior to and/or after VM migration has occurred. In the transparent model, the VM does not notify the guest OS about VM migrations that occur, and instead seeks to perform migrations that are transparent to the guest OS, meaning that the guest OS is not aware that a migration is occurring or has occurred.

The virtualization technology that facilitates the creation and use of VMs makes the VMs hardware agnostic, meaning that a VM can be run on a variety of hardware configurations. However, the agnostic nature of VMs has limitations. For example, depending on the hardware configurations at the source and destination of a live VM migration, the guest OS running on the migrating VM will not operate optimally without configuration adjustments to OS components. The guest OS can make the configuration adjustments once it becomes aware of the hardware change. However, a problem arises when the guest OS is unaware of the hardware change, for example where the guest OS is running on a VM that is configured to perform migrations that are transparent to the guest OS.

The illustrative embodiments recognize that there is a need for improved hardware detection for a guest OS running on a VM, including guest OS's that require or would benefit from configuration changes for certain hardware components, such as CPUs or GPUs. Current methods of configuring an OS for particular hardware configurations involve user intervention, generally upon noticing and troubleshooting errors occurring in the guest OS, which is inefficient and time-intensive.

The illustrative embodiments recognize that the presently available tools or solutions do not address these needs or provide adequate solutions for these needs. The illustrative embodiments generally address and solve the above-described problems and other problems related to errors arising in a guest OS due to an undetected or unannounced VM migration. In some embodiments, a guest OS running on a VM detects a VM migration for a variety of VMs having different migration notification models, including transparent models where the VM is configured to be migrated from one host computer system to another without notifying the guest OS. In an embodiment, the guest OS detects that the VM has been migrated from a source computer system to a destination computer system by monitoring a host identifier (HID) and recognizing that a change to the HID means that there has been a change to the hardware operating the VM, and therefore means that a VM migration has occurred.

An "identifier," as used herein, refers to any information that is uniquely associated with some hardware or software, and depending on the embodiment, can be uniquely associated with a specific one piece of hardware, such as a serial number or licensing information, or can be uniquely associated with some broader aspect of hardware or software, non-limiting examples of which include information that is uniquely associated with a model, class, type, version, brand, or revision of hardware or software. In some embodiments, migration detection by the guest OS is primarily concerned with a certain changes to the host computer system and/or the VM, such that a VM migration to another host computer system that has the same hardware of concern is not of interest to the guest OS and is therefore ignored.

An embodiment can be implemented as a software application. The application implementing an embodiment can be configured as a modification of an existing system, as a separate application that operates in conjunction with an existing system, a standalone application, or some combination thereof.

In an embodiment, a guest OS running on a VM determines whether the VM will notify the guest OS in the event of a VM migration. Upon determining that the VM does not notify the guest OS about VM migrations, but instead performs migrations that are transparent to the guest OS, the guest OS initiates a migration detection routine that includes monitoring an HID. The guest OS detects a VM migration by detecting a change in the HID.

In an embodiment, a guest OS running on a VM is provided with a VMID and an HID in response to one or more queries by the guest OS. In an embodiment, the queries by the guest OS includes polling a central processing unit (CPU) register for information about a host computer system running the VM. For example, in an embodiment, a host computer system comprises a CPU that includes special purpose registers (SPRs) implemented on the processor core that serve a variety of uses, such as debugging, timers, memory management, and interrupts. In some embodiments, the SPRs include registers that store identifying information about the CPU, such as a processor version register (PVR), a system version register (SVR), and/or a chip identification register (CIR). In some embodiments, a PVR stores various information about the CPU, such as a manufacturer's ID, a core type, a core version, and a core revision. The PVR or CIR distinguishes between processor cores that differ in attributes that may affect software, and the PVR values allow software to differentiate between multiple processor core types. In an integrated device, the PVR identifies the core, and the SVR identifies the IC.

In an embodiment, the guest OS queries firmware or data stored in memory that includes descriptions of hardware components associated with the host computer system and/or the VM. For example, in an embodiment, the guest OS queries a device tree or configuration files for identifying information about the VM and/or the host computer system. In some embodiments, the guest OS is provided with a VMID and an HID in response to a single query, such as a query to a device tree. In some embodiments, the guest OS is provided with a VMID in response to one request, and is provided with an HID in response to another request.

In an embodiment, a guest OS running on a VM detects a VM migration where the VM is being or has been migrated from a source computer system to a destination computer system by comparing an HID received in response to an HID query by the guest OS to a previously-stored HID and detecting that the HID has changed. In an embodiment, the HID query is one of a plurality of periodic HID queries from the guest OS to a current host computer system. In some embodiments, the plurality of periodic HID queries from the guest OS to the current host computer system are made at fixed intervals. In some embodiments, the fixed intervals can be any desired period of time within current hardware capabilities.

In some embodiments, the fixed intervals can be selected to prevent a post-migration error from occurring. For example, in some embodiments, an error occurs after some period of time t in the guest OS if the VM migrates to certain hardware. In such embodiments, the guest OS selects a fixed interval i<t in order to prevent the error from occurring by never allowing the period of time t to pass without detecting the migration and making configuration changes to prevent the error.

In an embodiment, a guest OS running on a VM detects a VM migration where the VM is being or has been migrated from a source computer system to a destination computer system by comparing an HID received in response to an HID query by the guest OS to a previously-stored HID and detecting that the HID has changed. In an embodiment, the HID query is one of a plurality of periodic HID queries from the guest OS to a current host computer system. In some embodiments, the plurality of periodic HID queries from the guest OS to the current host computer system are made at varying intervals. In some embodiments, the varying intervals can be any desired periods of time within current hardware capabilities. In some embodiments, the varying intervals are dependent on availability of system resources. For example, in some embodiments, the queries are set to a low priority and will wait for other system processes to be completed or for system resources to become available before a next query is issued.

In an embodiment, a guest OS running on a VM detects a VM migration from a source computer system to a destination computer system upon receiving a new HID in response to a query to the host computer system, where the new HID is associated with the destination computer system, and where the guest OS detects the new HID based on a comparison with a previously-stored HID associated with the source computer system. In an embodiment, the guest OS stores the new HID in a computer memory and uses the new HID to detect a future VM migration based on another change to the HID of the host computer system. In an embodiment, the guest OS overwrites the previously-stored HID when storing the new HID in memory. In an embodiment, the guest OS stores a number of previous host-system HIDs in the computer memory in addition to storing the current HID.

In an embodiment, a guest OS running on a VM detects a VM migration from a source computer system to a destination computer system based at least in part on a comparison of a previously-received HID to a recently-received HID. In such embodiments, the guest OS detects, based on the recently-received HID, that a configuration change to the guest OS is desirable. In such embodiments, the guest OS makes the configuration change to the guest OS. In an embodiment, the configuration change includes adjusting a performance measurement setting.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
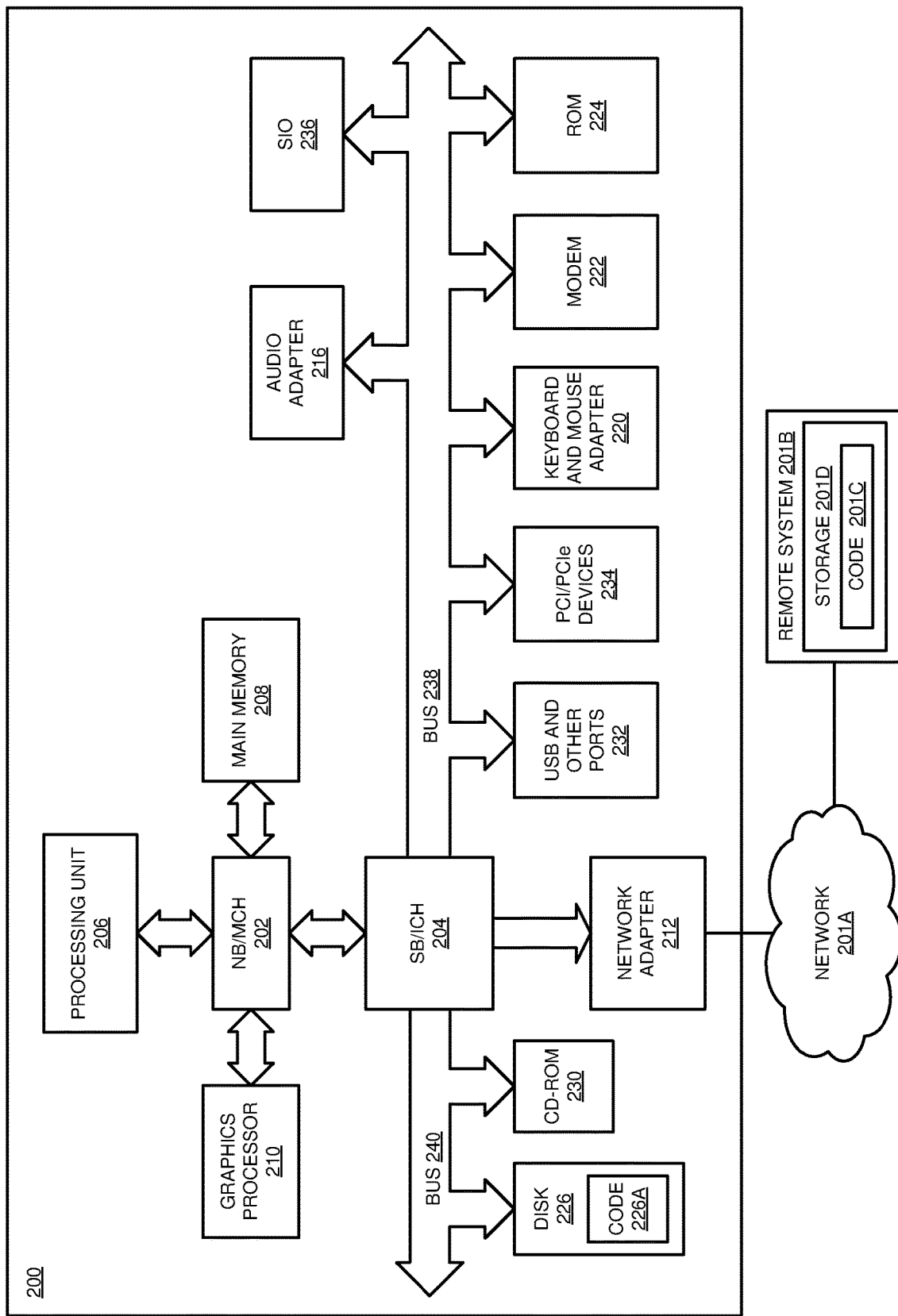
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes VM application 105B that includes a guest OS and which may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by VM application 105B such as initiating processes described herein of a guest OS hosted by a VM. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, OS images, and applications to clients 110, 112, and 114. Clients 110, 112, and 114 may be clients to server 106 in this example. Clients 110, 112, 114, or some combination thereof, may include their own data, boot files, OS images, and applications. Data processing environment 100 may include additional servers, clients, and other devices that are not shown.

In the depicted example, memory 124 may provide data, such as boot files, OS images, and applications to processor 122. Processor 122 may include its own data, boot files, OS images, and applications. Data processing environment 100 may include additional memories, processors, and other devices that are not shown.

In an embodiment, one or more of VM application 105A of data processing system 104 and VM application 105B of server 106 implements an embodiment of a VM running a guest OS as described herein. In a particular embodiment, the VM running a guest OS is implemented using one of network application 105A and network application 105B within a single server or processing system. In another particular embodiment, the VM running a guest OS is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors, one or more special purpose registers (SPRs), such as a processor version register (PVR), system version register (SVR), and/or chip identification register (CIR), and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An OS runs on processing unit 206. The OS coordinates and provides control of various components within data processing system 200 in FIG. 2. The OS may be a commercially available OS for any type of computing platform, including but not limited to server systems, personal computers, and mobile devices. An object oriented or other type of programming system may operate in conjunction with the OS and provide calls to the OS from programs or applications executing on data processing system 200.

Instructions for the OS, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing OS files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
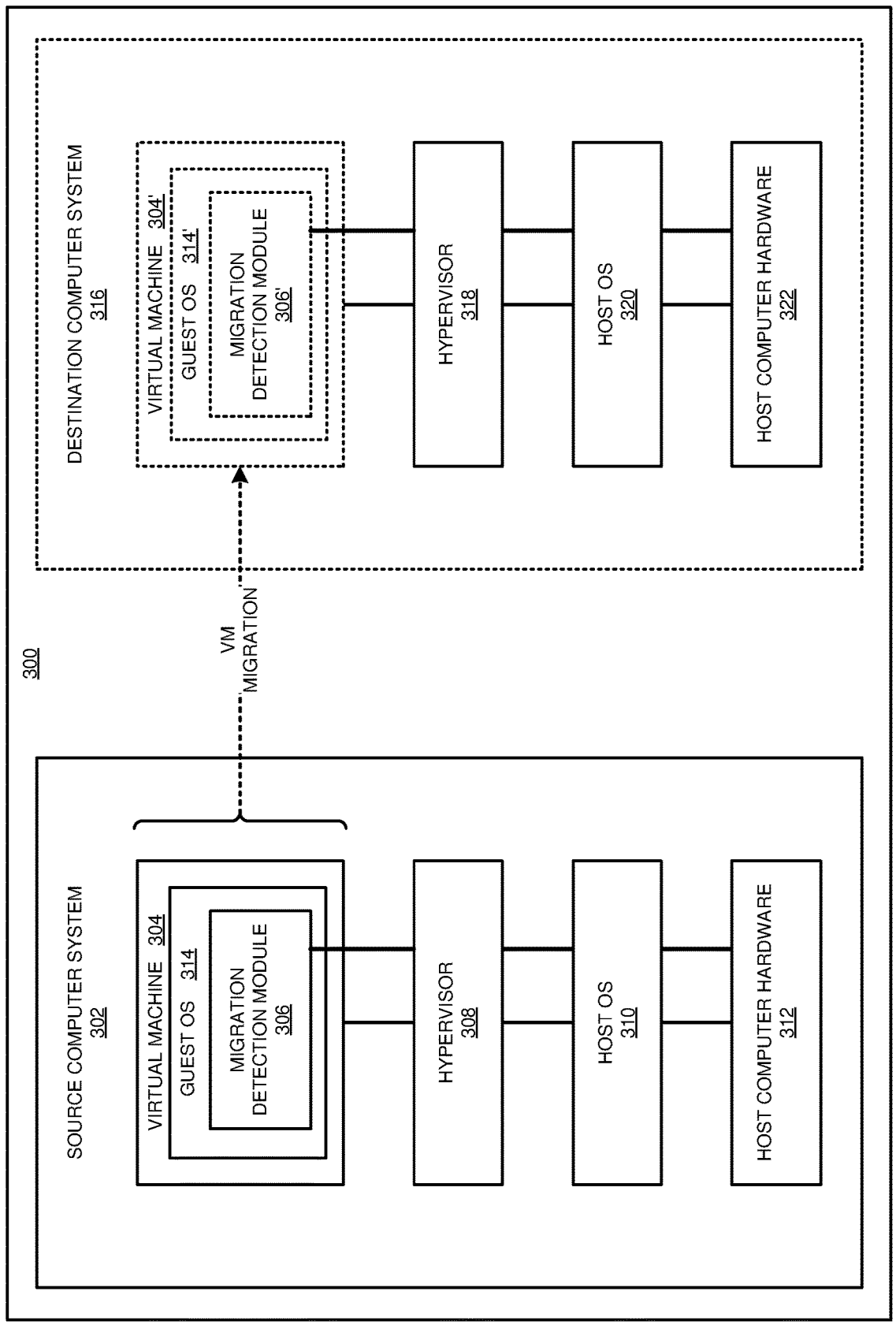
FIG. 3 depicts a block diagram of an example computing system environment configuration for hosting VMs and supporting live migrations in accordance with an illustrative embodiment.

With reference to FIG. 3, this figure depicts a block diagram of an example computing system environment 300 in accordance with an illustrative embodiment. The example embodiment includes a virtual machine 304 running a guest OS 314. In a particular embodiment, virtual machine 304 running a guest OS 314 is an example of application 105A/105B of FIG. 1.

In the illustrated embodiment, a computing system environment 300 configured for live migration includes a source computer system 302 communicatively coupled to a destination computer system 316 over a computer communications network, for example a LAN, WAN, or the Internet. The source computer system 302 includes host computer hardware 312, which is an example of a data processing system 200 shown in FIG. 2, and which runs a host OS 310 supporting the operation of a hypervisor 308. The hypervisor 308, in turn, can manage the operation of a pre-migration version of VM 304, and VM 304 hosts the operation of a guest OS 314 having a migration detection module 306.

In the illustrated embodiment, the computing system environment 300 further includes a destination computer system 316. The destination computer system 316 includes host computer hardware 322, which is an example of a data processing system 200 shown in FIG. 2, and which runs a host OS 310 supporting the operation of a hypervisor 318. The hypervisor 318, in turn, can manage the operation of a post-migration version of VM 304', and post-migration version of VM 304' hosts the operation of the guest OS 304' having the migration detection module 306'. different virtualized computing environment 210B also can include at least one host server 230B supporting the operation of a hypervisor 240B. The hypervisor 240B, in turn, can manage the operation of multiple different VMs 260B and each VM 260B can host the execution of one or more application components (not shown) combined to provide a computing application. Of note, live migration logic 300 can be coupled both to the secure virtualized computing environment 210A and the different virtualized computing environment 210B. The live migration logic 300 can include program code enabled to live migrate a selected one of the VMs 260A from the secure virtualized computing environment 210A to the different virtualized computing environment 210B while maintaining the security of data communications therebetween.

In the illustrated embodiment, the program code having the migration detection module 306/306' can be enabled to detect a VM migrations. In some embodiments, the guest OS 306 running on the VM 304 detects a VM migration for a variety of VMs having different migration notification models, including transparent models where the VM is configured to be migrated from one host computer system to another without notifying the guest OS 314. In an embodiment, the guest OS 314 detects that the VM has been migrated from a source computer system 302 to a destination computer system 316 by monitoring a host identifier (HID) and recognizing that a change to the HID means that there has been a change to the hardware operating the VM, and therefore means that a VM migration has occurred.

Figure 4:
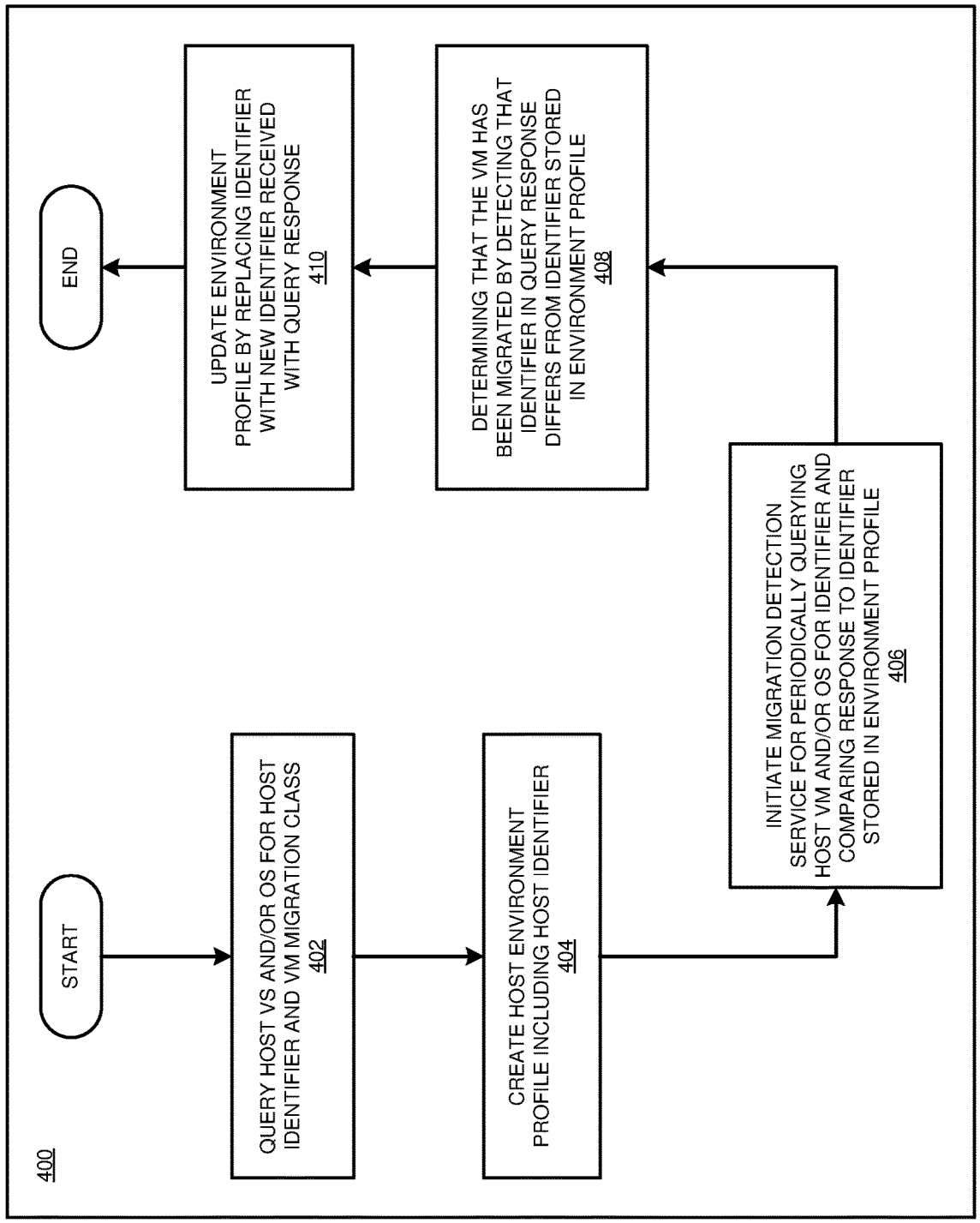
FIG. 4 depicts a flowchart of an example process for detecting a VM migration by a guest OS in accordance with an illustrative embodiment.

With reference to FIG. 4, this figure depicts a flowchart of an example process 400 for detecting a VM migration by a guest OS in accordance with an illustrative embodiment. In a particular embodiment, guest OS 314 and/or migration detection module 306 carries out the process 400.

In an embodiment, at block 402, the application queries a host VM and/or host OS for a host identifier and VM migration class. In some embodiments, the application detects whether the VM performs migrations that are transparent to the guest OS. Next, in an embodiment, at block 404, the application creates a host environment profile including the host identifier received in response to the request. Next, at block 406, the application initiates a migration detection service for periodically querying the host VM and/or OS for identifier and comparing response to identifier stored in environment profile. Next, at block 408, the application determines that the VM has been migrated by detecting that identifier in query response differs from identifier stored in environment profile. Finally, at block 410, the application updates an environment profile by replacing identifier with new identifier received with query response.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, OS's, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
storing, by a guest operating system (OS) running on a virtual machine (VM), a VM identifier (VMID) provided by the VM and a first host identifier (HID) provided by a first host computer system in a computer memory;
determining, by the guest OS, that the VM performs migrations that are transparent to the guest OS;
detecting, by the guest OS, that the VM has been migrated based on a comparison of the first HID to a second HID provided to the guest OS in response to an HID request from the guest OS; and
updating, by the guest OS, responsive to detecting that the VM has been migrated, a configuration setting of the guest OS, wherein the updating of the configuration setting comprises making an optimization adjustment to a component of the guest OS.

2. The computer implemented method of claim 1, wherein the VMID is provided by the VM in response to a VMID request from the guest OS.

3. The computer implemented method of claim 2, wherein the HID is provided by the first host computer system in response to an initial HID request from the guest OS.

4. The computer implemented method of claim 1, wherein the VMID and the first HID are provided to the guest OS in response to an initial request from the guest OS.

5. The computer implemented method of claim 1, wherein the determining that the VM performs migrations that are transparent to the guest OS is based at least in part on the VMID provided by the VM.

6. The computer implemented method of claim 1, wherein the HID request is one of a plurality of periodic HID requests from the guest OS to a current host computer system.

7. The computer implemented method of claim 6, wherein the plurality of periodic HID requests include requests from the guest OS made at fixed intervals.

8. The computer implemented method of claim 6, wherein the plurality of periodic HID requests include requests from the guest OS made at varying intervals.

9. The computer implemented method of claim 1, further comprising storing, by the guest OS, responsive to detecting that the VM has been migrated, the second HID in the computer memory.

10. The computer implemented method of claim 6, wherein the storing of the second HID includes overwriting the first HID in the computer memory.

11. The computer implemented method of claim 1, wherein the updating of the configuration setting includes making a configuration change that prevents an error that would otherwise occur.

12. The computer implemented method of claim 11, wherein the updating of the configuration setting includes determining a settings change to make based at least in part on the second HID.

13. A computer usable program product for detecting a VM migration, the computer program product comprising one or more computer readable storage media, and program instructions collectively stored on the one or more computer readable storage media, the program instructions executable by controller circuitry to cause the controller circuitry to perform operations comprising:
storing, by a guest OS running on a VM, a VM identifier (VMID) provided by the VM and a first host identifier (HID) provided by a first host computer system in a computer memory;
determining, by the guest OS, that the VM performs migration that are transparent to the guest OS;
detecting, by the guest OS, that the VM has been migrated based on a comparison of the first HID to a second HID provided to the guest OS in response to an HID request from the guest OS; and
updating, by the guest OS, responsive to detecting that the VM has been migrated, a configuration setting of the guest OS, wherein the updating of the configuration setting comprises making an optimization adjustment to a component of the guest OS.

14. The computer usable program product of claim 13, further comprising storing, by the guest OS, responsive to detecting that the VM has been migrated, the second HID in the computer memory.

15. The computer usable program product of claim 13, wherein the updating of the configuration setting includes determining a settings change to make based at least in part on the second HID.

16. The computer usable program product of claim 13, wherein the stored program instructions are stored in a computer readable storage device in a data processing system, and wherein the stored program instructions are transferred over a network from a remote data processing system.

17. The computer usable program product of claim 13, wherein the stored program instructions are stored in a computer readable storage device in a server data processing system, and wherein the stored program instructions are downloaded over a network to a remote data processing system for use in a computer readable storage device associated with the remote data processing system, further comprising:
program instructions to meter use of the computer usable code associated with the request; and
program instructions to generate an invoice based on the metered use.

18. A computer system comprising a processor and one or more computer readable storage media, and program instructions collectively stored on the one or more computer readable storage media, the program instructions executable by the processor to cause the processor to perform operations comprising:
- storing, by a guest OS running on a VM, a VM identifier (VMID) provided by the VM and a first host identifier (HID) provided by a first host computer system in a computer memory;
- determining, by the guest OS, that the VM performs migrations that are transparent to the guest OS;
- detecting, by the guest OS, that the VM has been migrated based on a comparison of the first HID to a second HID provided to the guest OS in response to an HID request from the guest OS; and
- updating, by the guest OS, responsive to detecting that the VM has been migrated, a configuration setting of the guest OS, wherein the updating of the configuration setting comprises making an optimization adjustment to a component of the guest OS.

19. The computer system of claim 18, further comprising storing, by the guest OS, responsive to detecting that the VM has been migrated, the second HID in the computer memory.

20. The computer system of claim 18, wherein the updating of the configuration setting includes determining a settings change to make based at least in part on the second HID.

* * * * *